United States Patent [19]
Irokawa et al.

[11] Patent Number: 6,148,837
[45] Date of Patent: Nov. 21, 2000

[54] AUTOMATIC PNEUMATIC PRESSURE CONTROL APPARATUS AND METHOD OF CONTROLLING SAME

[75] Inventors: Kenji Irokawa; Tomohiko Aki, both of Ibaraki-ken, Japan

[73] Assignee: SMC Kabushiki Kaisha, Tokyo, Japan

[21] Appl. No.: 09/069,986

[22] Filed: Apr. 30, 1998

[30] Foreign Application Priority Data

May 1, 1997 [JP] Japan .................................. 9-113277

[51] Int. Cl.$^7$ ............................................ F16K 31/02
[52] U.S. Cl. ................................ 137/1; 251/129.04
[58] Field of Search .................... 251/129.04, 129.05; 137/1

[56] References Cited

U.S. PATENT DOCUMENTS

| | | | |
|---|---|---|---|
| 3,699,989 | 10/1972 | O'Connor et al. ................ | 251/129.05 |
| 4,354,224 | 10/1982 | Sato ................................... | 364/183 |
| 4,638,837 | 1/1987 | Buike et al. ....................... | 251/129.05 |
| 5,059,880 | 10/1991 | Hiroi ................................. | 318/610 |
| 5,335,165 | 8/1994 | Shinskey .......................... | 364/162 |
| 5,573,032 | 11/1996 | Lenz et al. ........................ | 137/486 |

*Primary Examiner*—Kevin Shaver
*Assistant Examiner*—Eric Keasel
*Attorney, Agent, or Firm*—Oblon, Spivak, McClelland, Maier & Neustadt, P.C.

[57] ABSTRACT

When a reference signal is changed stepwise, a switch is open, and a pneumatic device with a dead time starts being actuated in a PD control mode. After elapse of the dead time, when a controlled variable changes and a position detector produces an output signal, a speed signal which is a differential of a feedback signal changes from a value "0". When a speed detector detects when the speed signal is equal to or greater than a predetermined value, a switching signal is applied to close the switch. After the switch is closed, the pneumatic device is actuated in a PID mode. An overshoot or an oscillation in a controlled variable due to the integration of the dead time in an I control mode can be suppressed.

16 Claims, 7 Drawing Sheets

AUTOMATIC PNEUMATIC PRESSURE CONTROL APPARATUS AND METHOD OF CONTROLLING SAME

BACKGROUND OF THE INVENTION

1. Field of the Invention

The present invention relates to an automatic pneumatic pressure control apparatus for automatically controlling an output pneumatic pressure produced by a pneumatic pressure device and a method of controlling such an automatic pneumatic pressure control apparatus, and more particularly to an automatic pneumatic pressure control apparatus for use as an electropneumatic transducer as a pneumatic pressure device or a pneumatic pressure actuator employing such an electropneumatic transducer, and a method of controlling such an automatic pneumatic pressure control apparatus.

2. Description of the Related Art

Electropneumatic transducers constitute one category of automatic pneumatic pressure control apparatus which are actuated by an electric input signal supplied as a manipulated variable (also referred to as a "manipulated variable signal") according to an automatic control process. In response to the electric input signal, the electropneumatic transducer generates a pneumatic pressure as an output signal known as a controlled variable or a controlled variable signal, and an electric signal corresponding to the pneumatic pressure is fed back to the electropneumatic transducer.

A flow control valve or the like is connected to an outlet port of the electropneumatic transducer, making up a pneumatic pressure actuator as an automatic pneumatic pressure control apparatus. In response to an electric input signal (manipulated variable) applied to the electropneumatic transducer, the pneumatic pressure actuator produces an output signal (controlled variable) representing the opening of the valve member of the flow control valve, and the output signal is fed back to the pneumatic pressure actuator.

One known automatic pneumatic pressure control apparatus is disclosed in Japanese laid-open patent publication No. 7-4401 entitled "Electropneumatic transducer apparatus and actuator system employing same", filed by the present applicant.

Generally, automatic pneumatic pressure control apparatus employ the principles of the PID (Proportional plus Integral plus Derivative) control mode. According to the PID control mode, an offset-free, stable, and accurate response can be achieved when supplied with a signal that changes stepwise from a value "0" to a value "1", such as a step signal (step input), for example, as a reference signal (also called a "reference input" or an "input signal").

Pneumatic devices suffer a dead time which is consumed after a manipulated variable is supplied until a controlled variable is actually operated. If such a dead time is large, a so-called overshoot or a large oscillation tends to occur due to the integral control during the dead time.

In an effort to solve the above problem, there has been developed an automatic pneumatic pressure control apparatus for automatically controlling a pneumatic device which suffers a dead time in response to a step input according to the PID control mode. Specifically, at the start of the control process, the automatic pneumatic pressure control apparatus starts to control the pneumatic device according to PD (Proportional plus Derivative) control. If a detected error, which is the difference between a reference signal and a feedback signal, becomes smaller than a predetermined value, i.e., after the elapse of the dead time, the PD control mode is changed to the PID control mode to eliminate an overshoot or an oscillation.

SUMMARY OF THE INVENTION

It is therefore an object of the present invention to provide an automatic pneumatic pressure control apparatus which is substantially free of an overshoot or an oscillation and a method of controlling such an automatic pneumatic pressure control apparatus.

Another object of the present invention is to provide an automatic pneumatic pressure control apparatus which is capable of flexibly handling a change in signal transfer characteristics thereof, and a method of controlling such an automatic pneumatic pressure control apparatus.

The above and other objects, features, and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
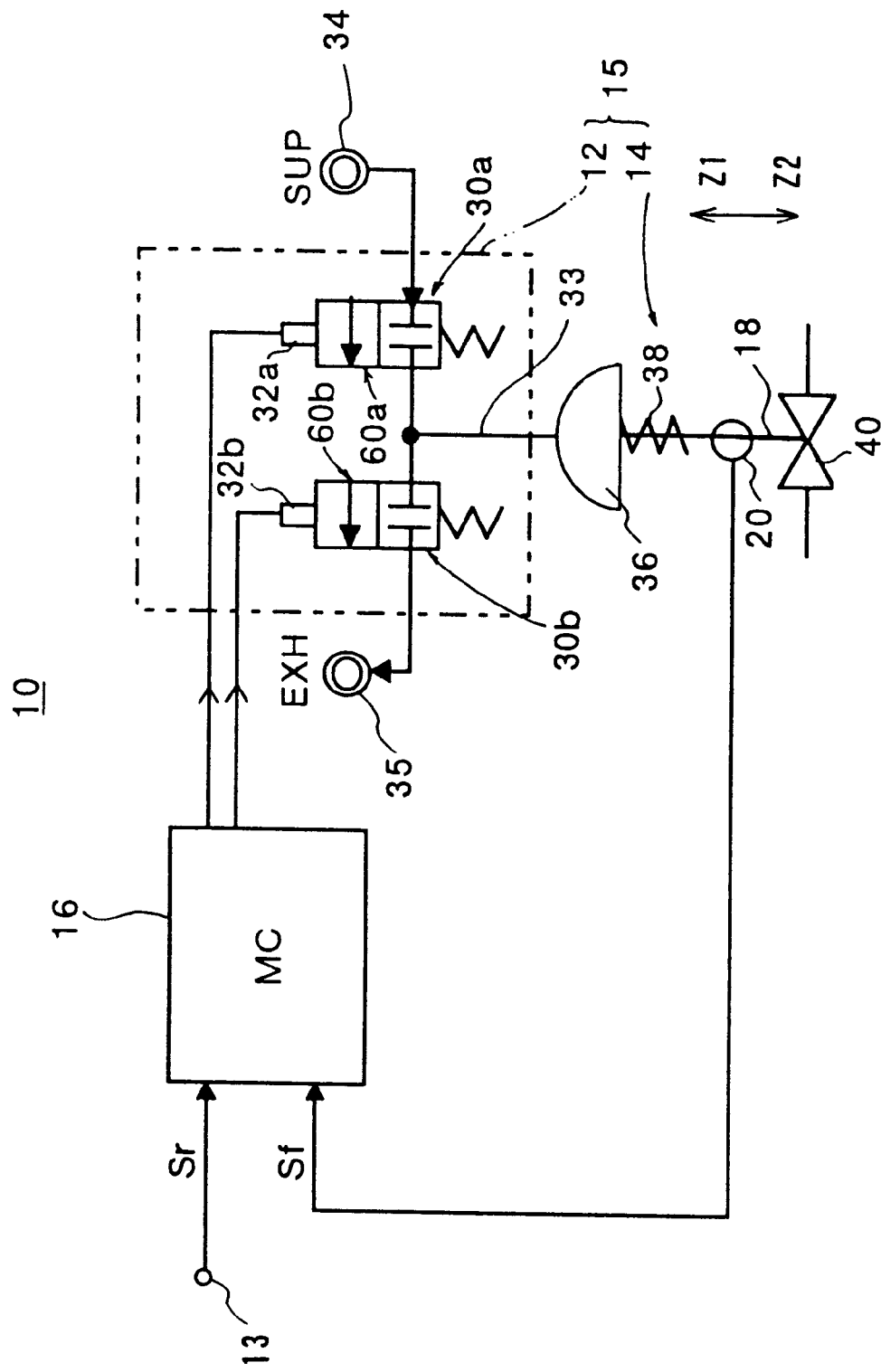
FIG. 1 is a circuit diagram, partly in block form, an automatic pneumatic pressure control apparatus according to an embodiment of the present invention.

Like or corresponding parts are denoted by like or corresponding reference characters throughout views.

As shown in FIG. 1, an automatic pneumatic pressure control apparatus 10 according to an embodiment of the present invention incorporates a pneumatic device 15 which generally comprises an electropneumatic transducer 12 and a pneumatic actuator 14 that can be controlled by the electropneumatic transducer 12.

More specifically, the automatic pneumatic pressure control apparatus 10 basically comprises a microcomputer 16 for being supplied with a reference signal Sr corresponding to a setpoint through an input terminal 13, the electropneumatic transducer 12 operable by a manipulated variable signal which is an output signal from the microcomputer 16, the pneumatic actuator 14 operable by an output signal (pneumatic pressure) from the electropneumatic transducer 12, and a position detector 20 for detecting a distance by which a stem 18 of the pneumatic actuator 14 is displaced, as a controlled variable signal, converting the controlled variable signal into an electric signal (feedback signal) Sf, and transmitting the electric signal Sf to the microcomputer 16.

The electropneumatic transducer 12 comprises a pair of identical electropneumatic transducer units 30a, 30b. The electropneumatic transducer unit 30a has an input port supplied with compressed air from an inlet port 34 connected to a pneumatic pressure supply SUP, and an output port connected to an input port of the electropneumatic transducer unit 30b. The electropneumatic transducer unit 30b has an output port connected to an exhaust port 35 which is vented to the atmosphere.

The electropneumatic transducer units 30a, 30b have respective nozzle flapper mechanisms 32a, 32b which are supplied with the manipulated variable signal from the microcomputer 16.

The output port of the electropneumatic transducer unit 30a and the input port of the electropneumatic transducer unit 30b are interconnected by a pipe 33 that is coupled to a diaphragm chamber 36 of the pneumatic actuator 14, which serves as a flow control valve.

When a pneumatic pressure is supplied from the inlet port 34 through the electropneumatic transducer unit 30a and the pipe 33 into the diaphragm chamber 36, thereby developing a pressure buildup in the diaphragm chamber 36, the stem 18 is displaced in the direction indicated by the arrow Z2 against the bias of a compression spring 38, tending to open a regulating valve (control valve) 40. When a pneumatic pressure is discharged from the diaphragm chamber 36 through the pipe 33 and the electropneumatic transducer unit 30b into the exhaust port 35, thereby causing a pressure reduction in the diaphragm chamber 36, the stem 18 is displaced in the direction indicated by the arrow Z1 under the bias of the compression spring 38, tending to close the regulating valve 40. In this manner, the degree of opening of the regulating valve 40 is adjusted.

When the electropneumatic transducer unit 30a connected to the inlet port 34 is closed and the electropneumatic transducer unit 30b connected to the exhaust port 35 is open, thus venting the diaphragm chamber 36 to the atmosphere, the stem 18 is held in a home position at the limit end in the direction indicated by the arrow Z1 under the bias of the compression spring 38. In this position, the regulating valve 40 is fully closed.

The distance by which the stem 18 is displaced, or the degree of opening of the regulating valve 40, or the rate of a fluid flowing through the regulating valve 40 represents a controlled variable. An electric output signal generated by the position detector 20 in proportion to the controlled variable is supplied as the feedback signal Sf to the microcomputer 16.

In the automatic pneumatic pressure control apparatus 10 shown in FIG. 1, the reference signal Sr may be considered to be a signal for determining the degree of opening of the regulating valve 40 or the rate of a fluid flowing through the regulating valve 40.

The microcomputer 16 functions as energizing, controlling, processing, and deciding means. As well known in the art, the microcomputer 16 comprises a microprocessor (MPU) corresponding to a central processing unit (CPU), an A/D converter and a D/A converter as input/output interfaces connected to the microprocessor, I/O ports, a read-only memory (ROM) storing a control program, a system program, and look-up tables, a random-access memory (RAM as a write/read memory) for temporarily storing processed data, a timer circuit, and an interrupt processing circuit. The microcomputer 16 is in the form of an LSI device with the above components integrated on one chip. The functions performed by the microcomputer 16 will be described later on.

Figure 2:
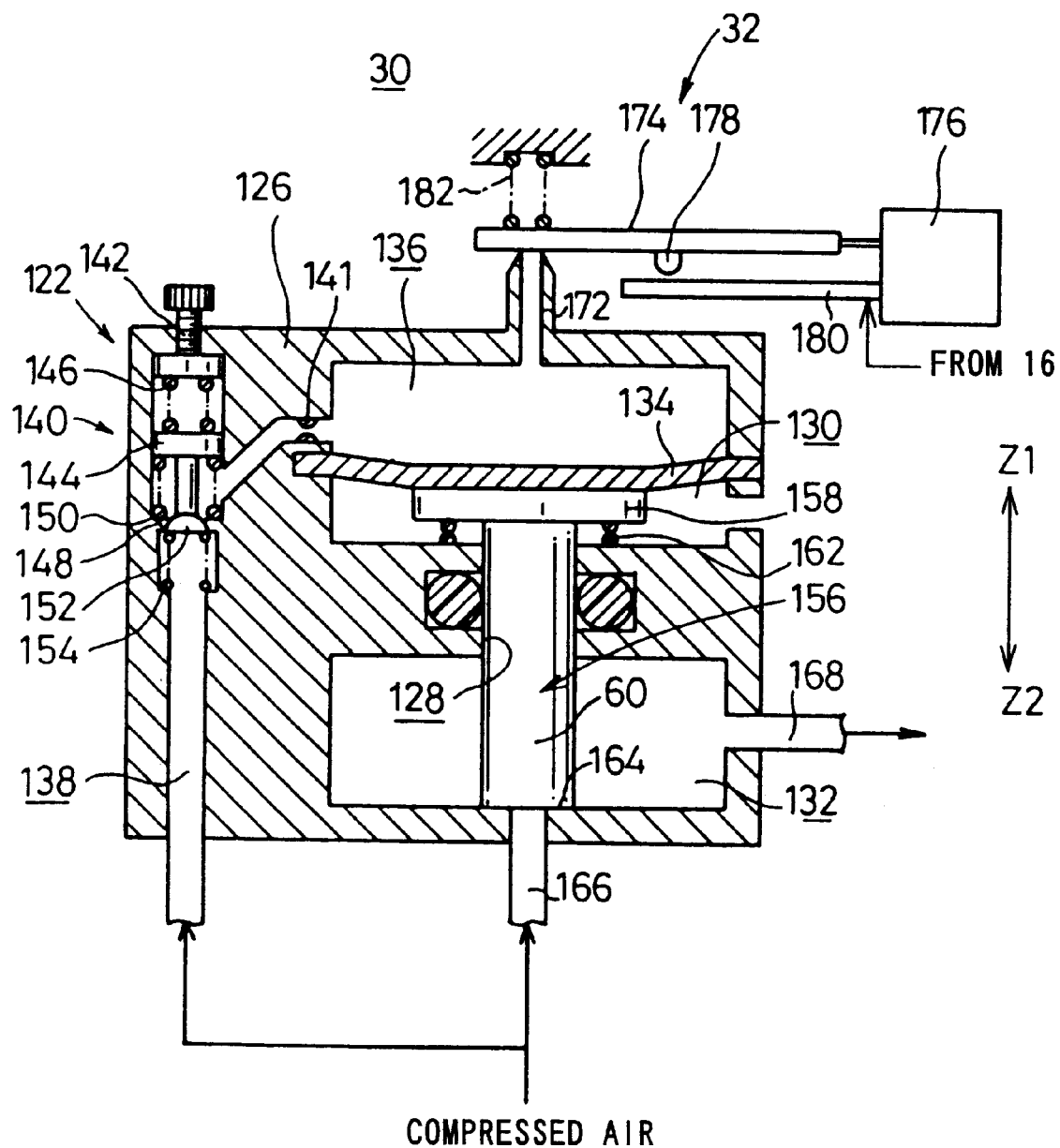
FIG. 2 is a cross-sectional view of an electropneumatic transducer unit in the automatic pneumatic pressure control apparatus shown in FIG. 1.

FIG. 2 shows in cross section each of the electropneumatic transducer units 30a, 30b. Since the electropneumatic transducer units 30a, 30b are identical in structure to each other, they will be referred to collectively as an electropneumatic transducer unit 30. Though parts of the electropneumatic transducer units 30a, 30b are denoted by reference numerals with suffixes "a", "b" in FIG. 1, these suffixes "a", "b" will be omitted if the electropneumatic transducer unit 30 is described.

The electropneumatic transducer unit 30 shown in FIG. 2 is similar to one disclosed in Japanese laid-open patent publication No. 7-4401. The structure and operation of the electropneumatic transducer unit 30 will be described below.

The electropneumatic transducer unit 30 comprises a nozzle flapper mechanism 32 and a valve mechanism 122.

The valve mechanism 122 comprises a housing 126 having a first chamber 130 and a second chamber 132 which are defined therein and communicate with each other through a hole 128. A diaphragm 134 is disposed in the first chamber 130, dividing the first chamber 130 into a lower compartment and an upper compartment which serves as a nozzle back pressure chamber 136. The nozzle back pressure chamber 136 communicates with a supply passage 138 defined in the housing 126 and connected to a compressed air supply (not shown). The supply passage 138 accommodates therein a pressure reducing valve 140 and a fixed restriction 141. The pressure reducing valve 140 has a knob 142 threaded in the housing 126, a piston 144 slidably disposed in the supply passage 138, and a first spring 146 acting on the piston 144 and connected to the knob 142. When the knob 142 is manually turned, the bias of the first spring 146 is adjusted. A valve body 152 which can be seated on a valve seat 148 is also disposed in the supply passage 138. A second spring 150 is interposed between the piston 144 and the valve seat 148. The valve body 152 is held against a shank of the piston 144 by a third spring 154 which is disposed in the supply passage 138 beneath the valve seat 148. The piston 144 has a cross-sectional area greater than the cross-sectional area of the valve body 152.

If the pneumatic pressure in the nozzle back pressure chamber 136 is higher than the pneumatic pressure of the compressed air supply connected to the supply passage 138, then since the cross-sectional area of the piston 144 is greater than the cross-sectional area of the valve body 152, the piston 144 is urged upwardly, and the valve body 152 biased by the third spring 154 is also displaced upwardly until it is seated on the valve seat 148, disconnecting the nozzle back pressure chamber 136 from the compressed air supply. If the pneumatic pressure in the nozzle back pressure chamber 136 is lower than the pneumatic pressure of the compressed air supply, the valve body 152 is unseated off the valve seat 148 under the bias of the first spring 146, bringing the nozzle back pressure chamber 136 into pneumatic communication with the compressed air supply.

A valve assembly 156 disposed in the first chamber 130 and the second chamber 132 comprises a flange 158 positioned in the lower compartment of the first chamber 130 and a cylindrical rod (valve body) 60 extending downwardly from the flange 158 through the hole 128 into the second chamber 132 and axially movable in the hole 128. The flange 158 is held against the diaphragm 134 under the bias of a spring 162. When the diaphragm 134 is displaced, the cylindrical rod 60 is seated on or unseated off a valve seat 164 at the bottom of the second chamber 132. A supply passage 166 communicates with the second chamber 132 through the valve seat 164, and an exhaust passage 168 also communicates with the second chamber 132 through a side wall thereof. Therefore, pneumatic communication between the supply passage 166 and the exhaust passage 168 can be controlled by the cylindrical rod 60 because the cylindrical rod 60 closes the supply passage 166 when seated on the valve seat 164 and opens the supply passage 166 when unseated off the valve seat 164.

The nozzle flapper mechanism 32 comprises a nozzle 172 communicating with the nozzle back pressure chamber 136, a flapper 174 held against a distal end of the nozzle 172, a support 176 by which the flapper 174 is displaceably supported, a bimorph piezoelectric element 180 mounted on the support 176 and spaced a distance from a projection 178 on a lower surface of the flapper 174, and a spring 182 which normally urges the flapper 174 toward the nozzle 172. The bimorph piezoelectric element 180 is bent toward the flapper 174 when supplied with a positive voltage from the microcomputer 16, and is bent away from the flapper 174 when supplied with a negative voltage from the microcomputer 16.

Figure 3:
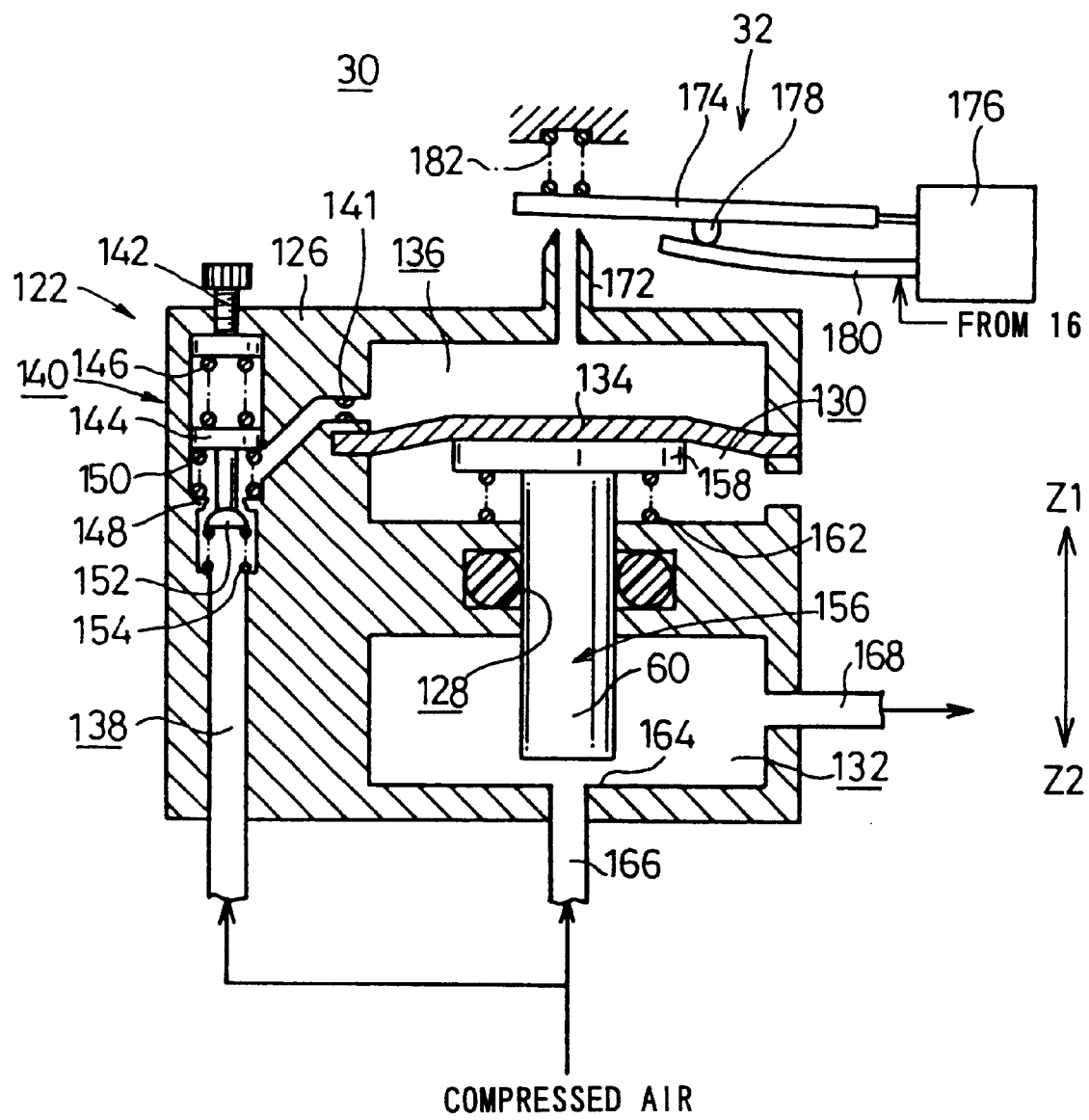
FIG. 3 is a cross-sectional view illustrating the manner in which the electropneumatic transducer shown in FIG. 2 operates.

Specifically, when a positive pulse is applied from the microcomputer 16 to the bimorph piezoelectric element 180, the bimorph piezoelectric element 180 is bent upwardly into contact with the projection 178 and presses the flapper 174 upwardly, as shown in FIG. 3. Therefore, the flapper 174 is spaced from the nozzle 172 against the bias of the spring 182. Since the nozzle 172 is opened, the pneumatic pressure in the nozzle back pressure chamber 136 is lowered, allowing the diaphragm 134 to be displaced upwardly in the direction indicated by the arrow Z1. The valve assembly 156 is also displaced in the direction indicated by the arrow Z1 under the bias of the spring 162 acting on the flange 158. As a result, the cylindrical rod 60 is unseated off the valve seat 164, allowing pneumatic communication between the supply passage 166 and the exhaust passage 168.

When a negative pulse is applied from the microcomputer 16 to the bimorph piezoelectric element 180, the bimorph piezoelectric element 180 is spaced from the projection 178, and the flapper 174 is brought into abutment against the nozzle 172 under the bias of the spring 182. Since the nozzle 172 is closed, the pneumatic pressure in the nozzle back pressure chamber 136 is increased, displacing the diaphragm 134 and the flange 158 downwardly in the direction indicated by the arrow Z2 against the bias of the spring 162. As a result, the cylindrical rod 60 is seated on the valve seat 164, cutting off pneumatic communication between the supply passage 166 and the exhaust passage 168.

For adjusting the position of the stem 18 to a desired position to open the regulating valve 40 to a desired level, the reference signal Sr is changed stepwise from a value "0" to a value "1" corresponding to the desired level.

The microcomputer 16 supplies an output signal not to actuate the nozzle flapper mechanism 32b of the electropneumatic transducer unit 30b connected to the exhaust port 35. Therefore, the valve body 60b of the electropneumatic transducer unit 30b is in the cut-off position. The nozzle flapper mechanism 32a of the electropneumatic transducer unit 30a is actuated by an output signal from the microcomputer 16 according to a PWM (Pulse Width Modulation) process disclosed in Japanese laid-open patent publication No. 7-4401. According to the PWM process, the pulse duration in each cycle is initially wider and subsequently progressively smaller. A feedback control process is carried out to move the stem 18 smoothly in the direction indicated by the arrow Z2 and stop the stem 18 exactly at a desired position corresponding to the value "1" of the reference signal Sr.

For returning the stem 18 to the original position, the reference signal Sr is changed back stepwise from the value "1" to the value "0". At this time, the microcomputer 16 inactivates the nozzle flapper mechanism 32a of the electropneumatic transducer unit 30a connected to the inlet port 34, bringing the valve body 60a of the electropneumatic transducer unit 30a into the cut-off position. Immediately thereafter, the microcomputer 16 actuates the nozzle flapper mechanism 32b of the electropneumatic transducer unit 30b according to the PWM process. At this time, a feedback control process is also carried out to move the stem 18 smoothly in the direction indicated by the arrow Z1 and stop the stem 18 exactly at a desired position corresponding to the value "0" of the reference signal Sr.

Figure 4:
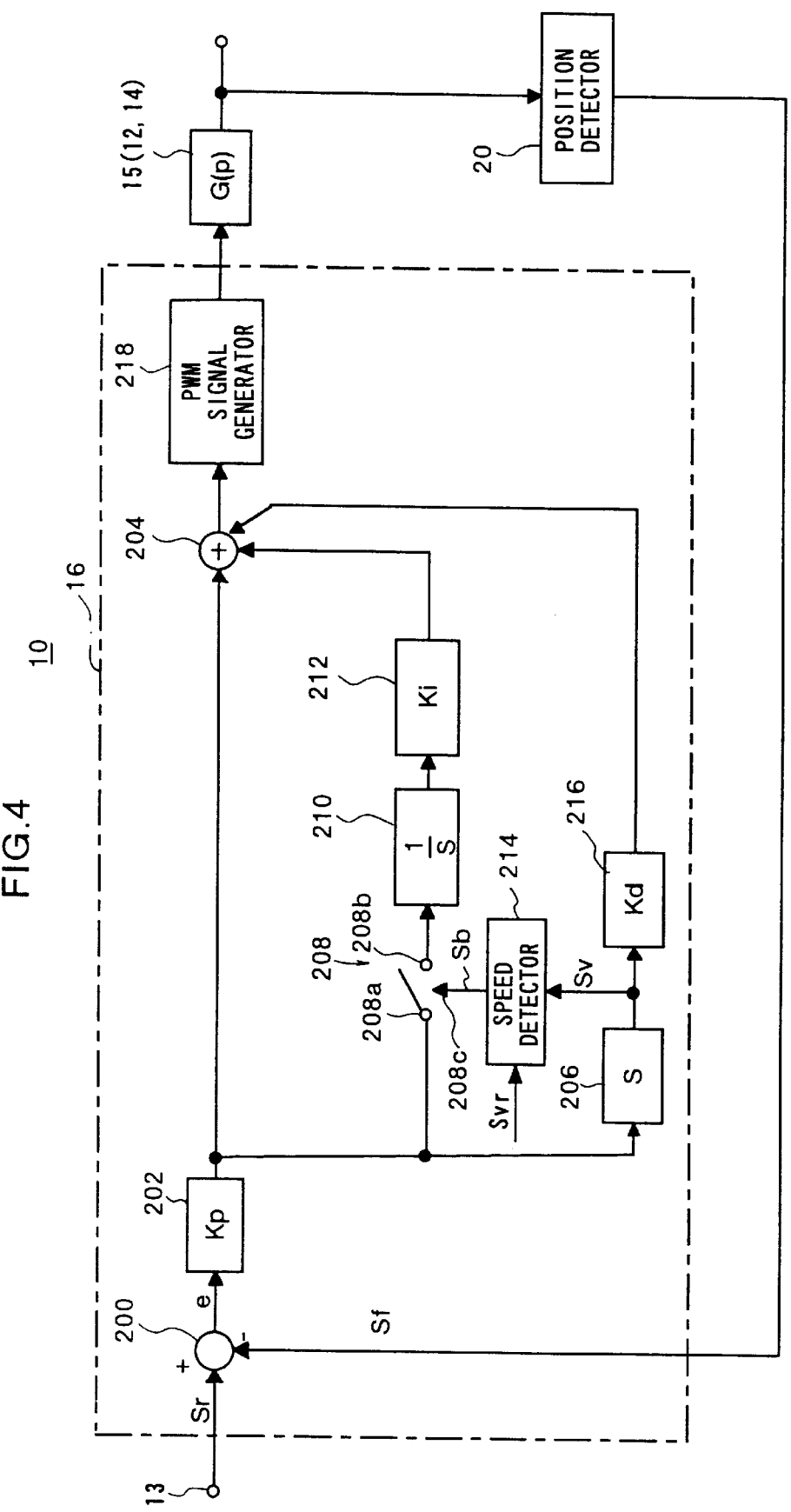
FIG. 4 is a block diagram of a control system arrangement of the automatic pneumatic pressure control apparatus shown in FIG. 1.

FIG. 4 shows in block form a control system arrangement of the automatic pneumatic pressure control apparatus shown in FIG. 1. In FIG. 4, the reference numeral 15 represents the pneumatic device 15 which comprises the electropneumatic transducer 12 and the pneumatic actuator 14, the pneumatic device 15 having a transfer function G(p), and the reference numeral 20 represents the position detector 20 for detecting the position of the stem 18 and hence the degree of opening of the regulating valve 40, the position detector 20 being capable of converting the position of the stem 18 as the controlled variable into an electric signal referred to as a feedback signal Sf. The functions performed by the microcomputer 16 are shown as various blocks surrounded by the dot-and-dash line in FIG. 4.

The reference signal Sr supplied from the input terminal 13 and the feedback signal Sf are added to each other by a summing point 200, which supplies an error signal e (e=Sr−Sf) to a proportional element 202 having a proportional gain Kp. The summing point 200 has its output terminal connected to a first input terminal of an adder 204, a differentiation element (speed element) 206 expressed by an operator "S", a movable terminal 208a of a switch 208.

The switch 208 has a fixed terminal 108b connected to a second input terminal of the adder 204 through an integration element 210 expressed by an operator "1/S" and a proportional element 212 expressed by an integration proportionality coefficient Ki.

A speed signal Sv outputted from the differentiation element 206 is supplied to a speed detector 214 and also to a proportional element 216 expressed by a differentiation proportionality coefficient Kd. The speed signal Sv is supplied from the proportional element 216 to a third input terminal of the adder 204.

The differentiation element 206 and the proportional element 216 are connected to each other by a junction that is connected to an input terminal of the speed detector 214. The speed signal Sv from the differentiation element 206 is supplied through the junction to the input terminal of the speed detector 214. The speed detector 214 compares the speed signal Sv with a predetermined value (also called a "threshold speed signal", a "reference signal", a "reference speed", or a "reference value") Svr, and supplies a switching signal Sb produced as a binary signal (on/off signal) as the result of comparing the signals Sv, Svr, to a control terminal 208c of the switch 208. The switching signal Sb controls the opening and closing the switch 208. Specifically, the switch 208 is opened when the switching signal Sb is of a low level, and closed when the switching signal Sb is of a high level.

An output signal from the adder 204, i.e., a manipulated variable signal according to a PD control mode or a PID control mode, is supplied through a PWM signal generator 218 to the electropneumatic transducer 12 of the pneumatic device 15.

For an easier understanding of the present invention, it is assumed that the electropneumatic transducer units 30a, 30b are alternately actuated, i.e., toggled, by the microcomputer 16.

Specifically, when a drive signal as a manipulated variable signal is supplied from the PWM signal generator 218 of the microcomputer 16 to the nozzle flapper mechanism 32a, such a drive signal as a manipulated variable signal is not supplied to the nozzle flapper mechanism 32b. When not supplied with a drive signal, the valve body 60 (60b) combined with the nozzle flapper mechanism 32b is in the cut-off position as shown in FIG. 2.

Operation of the automatic pneumatic pressure control apparatus 10 shown in FIGS. 1 through 4 will be described below with reference to FIG. 5. For an understanding of the operation of the control system arrangement, it is assumed that input and output terminals of the PWM signal generator 218 and the position detector 20 are short-circuited.

Figure 5:
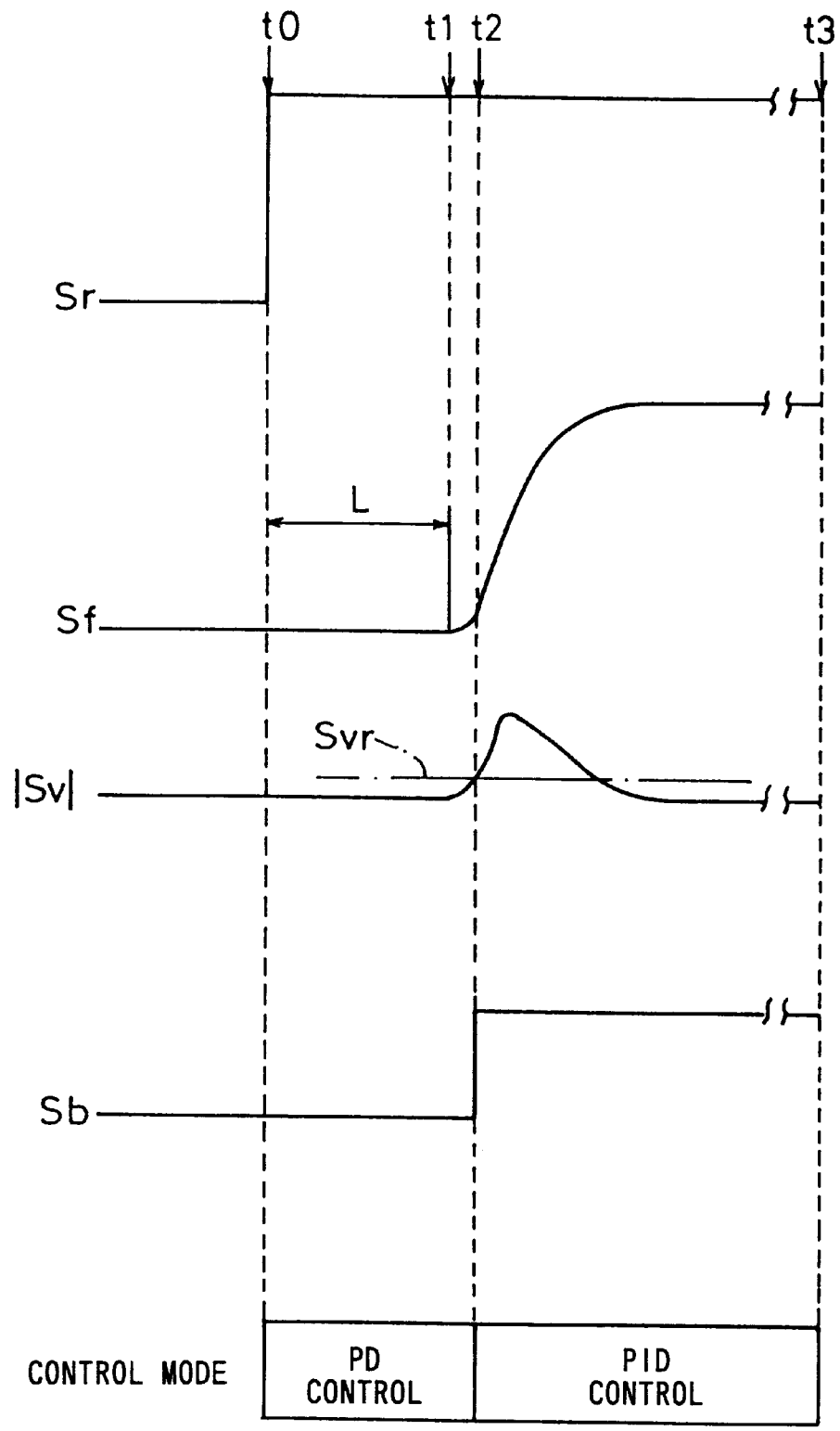
FIG. 5 is a diagram of waveforms illustrative of the manner in which the automatic pneumatic pressure control apparatus shown in FIG. 1 and the control system arrangement shown in FIG. 4 operate.

As shown in FIG. 5, a reference signal Sr which changes stepwise from a low level to a high level is supplied from the input terminal 13 to the summing point 200 at a time t0. At this time, the switch 208 is open as shown in FIG. 4 with the switching signal Sb being of a low level. Therefore, a PD control mode is carried out by the proportional element 202 and the differentiation element 206, starting to actuate the electropneumatic transducer unit 30a at the time t0.

Since no drive signal is supplied from the microcomputer 16 to the electropneumatic transducer unit 30b at this time, the valve body 60b is in the cut-off position. The nozzle flapper mechanism 32a of the electropneumatic transducer unit 30a is actuated to bring the valve body 60a into the open position.

The valve body 60a is brought into the open position as follows: When a positive pulse is applied to the bimorph piezoelectric element 180, the nozzle flapper mechanism 32 is actuated to move the flapper 174 away from the nozzle 172, venting the nozzle back pressure chamber 136 to the atmosphere. Strictly, there is a dead time consumed after the positive pulse is applied to the bimorph piezoelectric element 180 until the flapper 174 opens the nozzle 172 against the bias of the spring 182. After the nozzle back pressure chamber 136 is vented to the atmosphere, there is also a dead time consumed until the valve body 142 is unseated off the valve seat 148 under the bias of the first spring 146. Another dead time is consumed until the diaphragm 134 moves in the direction indicated by the arrow Z1.

In this manner, the valve body 60a is brought into the open position, allowing compressed air to be supplied from the inlet port 34 through the electropneumatic transducer unit 30a and the pipe 33 into the diaphragm chamber 36.

There is further a dead time consumed after the compressed air is introduced into the diaphragm chamber 36 until the stem 18 starts moving in the direction indicated by the arrow Z2 against the bias of the compression spring 38.

These dead times, spent after the nozzle flapper mechanism 32a of the electropneumatic transducer unit 30a until the stem 18 for determining a degree of opening of the regulating valve 40 actually starts to move, are represented by a time L (see FIG. 5) from the time t0 to a time t1. No integral control mode (I control mode) is effected during the time L from the time t0 to the time t1.

When the stem 18 starts moving in the direction indicated by the arrow Z1 at the time t1, the speed signal Sv starts to increase from a value "0" as shown in FIG. 5. When the absolute value |Sv| of the speed signal Sv exceeds the predetermined value Svr at a time t2, the switching signal Sb outputted from the speed detector 214 changes from a low level to a high level, changing the switch 208 from an open state to a closed state.

After the time t2, the PD control mode carried out by the proportional element 202 and the differentiation element 206 changes to a PID control mode carried by the carried out by the proportional element 202, the differentiation element 206, and the integration element 210.

The speed signal Sv is essentially of the value "0" up to the time t2. Therefore, the PD control mode functions essentially in a P control mode from the time t0 to the time t2.

After the time t2, when the value of the feedback signal Sf approaches the high level of the reference signal Sr, the absolute value |Sv| of the speed signal Sv becomes smaller than the reference value Svr. At this time, the switch 208 is not operated. Therefore, the PD control mode changes to the PID control mode when the absolute value |Sv| of the speed signal Sv increases across the reference value Svr, but the PID control mode is sustained when the absolute value |Sv| of the speed signal Sv decreases across the reference value Svr.

When the reference signal Sr increases or decreases stepwise at a time t3, the switch 208 is reset to the open state as shown in FIG. 4, whereupon the PID control mode changes back to the PD control mode.

As described above, when the reference signal Sr changes stepwise, the switch 208 is open, and the pneumatic device 15 starts being actuated under the P control mode or the PD control mode for the dead time L. After elapse of the dead time L, when the controlled variable changes to produce an output signal from the position detector 20, the value of the speed signal Sv, which is a differential of the feedback signal Sf, changes from the value "0". When the absolute value |Sv| of the speed signal Sv becomes equal to or greater than the predetermined value Svr as detected by the speed detector 214, the switching signal Sb changes from the low level to the high level, thereby closing the switch 208 at the time t2. After the time t2, therefore, the pneumatic device 15 is actuated under the PID control mode. The automatic pneumatic pressure control apparatus 10 offers the advantage that it can suppress an overshoot or an oscillation in a controlled variable due to the integration of the dead time L.

If the transfer function changes, e.g., if the stem 18 is stopped owing to sliding friction when the output controlled variable happens to fail to change after the step 18 has started to move, e.g., at a time when the movement of the stem 18 becomes slow (a time after the time t2 and near the time t3), then since the I control mode has started at the time t2 before the stem 18 is stopped, the stopped stem 18 can be moved again under the I control mode.

Figure 6:
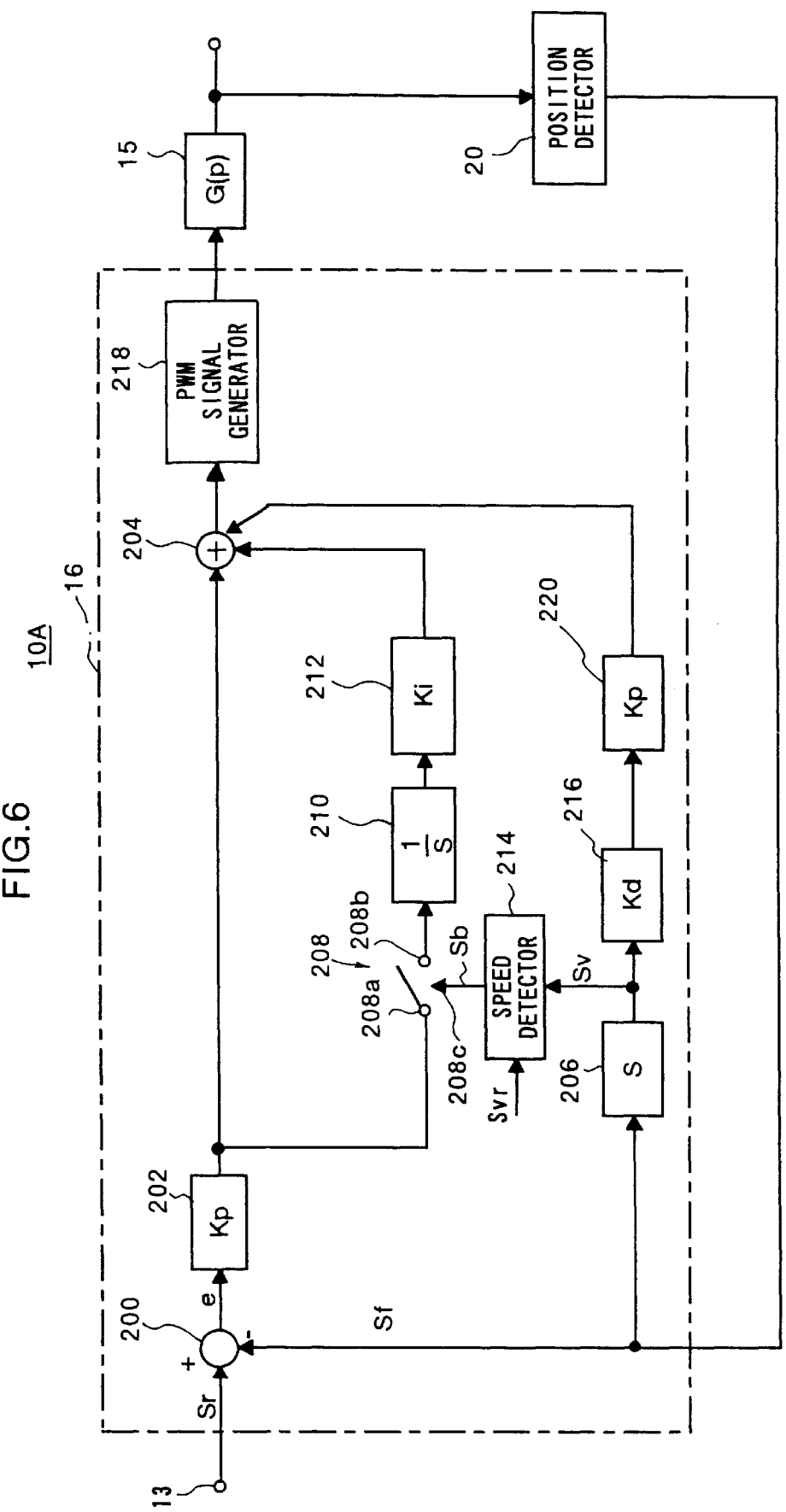
FIG. 6 is a block diagram of a control system arrangement of a modified automatic pneumatic pressure control apparatus.

FIG. 6 shows a control system arrangement of a modified automatic pneumatic pressure control apparatus 10A. In FIG. 6, the feedback signal Sf is supplied to the differentiation element 206, and a proportional element 220 having a transfer gain Kp is inserted between the proportional element 216 and the adder 204. The speed signal Sv is produced as an output signal from the differentiation element 206. Other details of the automatic pneumatic pressure control apparatus 10A are the same as those of the automatic pneumatic pressure control apparatus 10 shown in FIG. 4.

Figure 7:
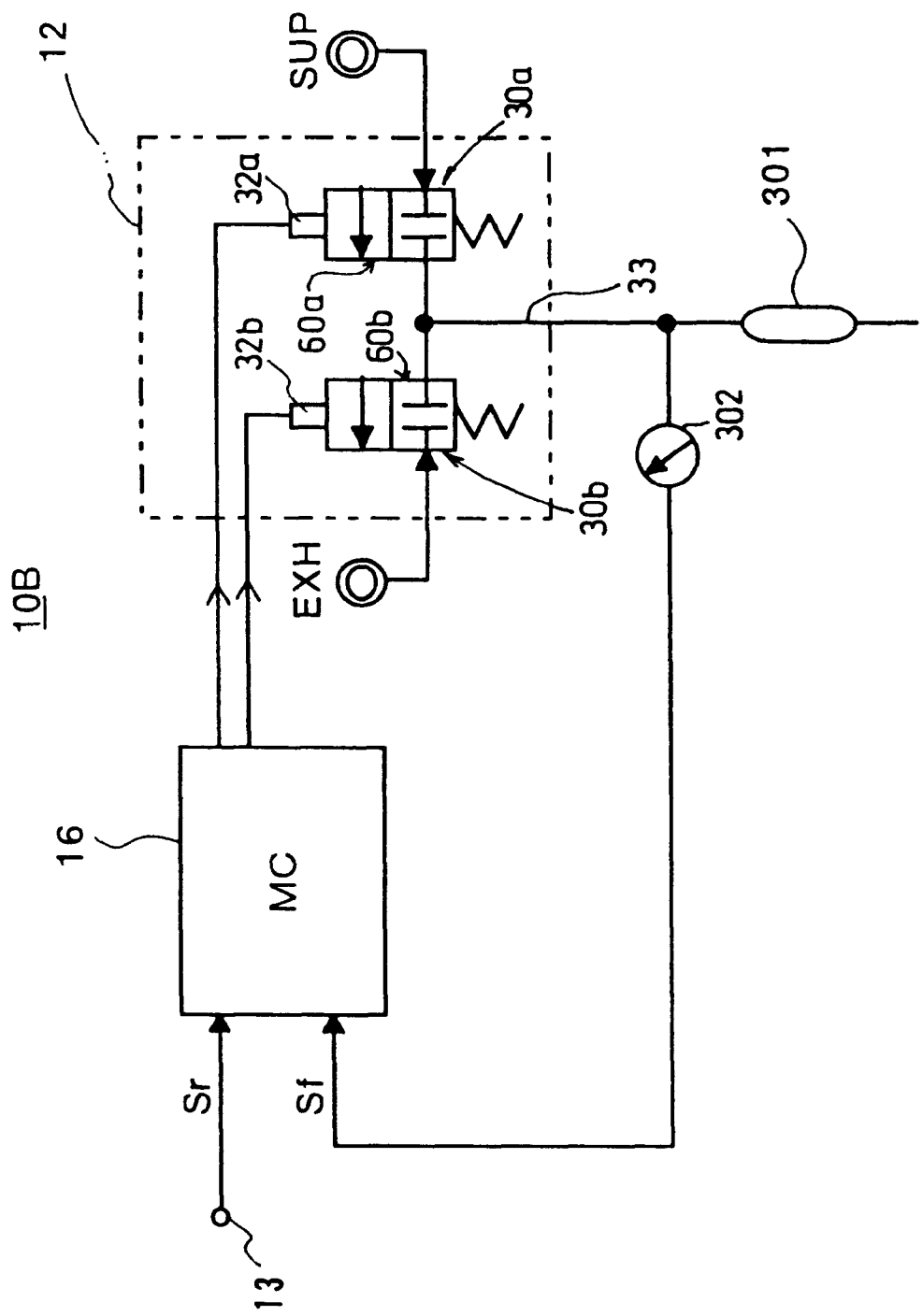
FIG. 7 is a circuit diagram, partly in block form, an automatic pneumatic pressure control apparatus according to another embodiment of the present invention.

FIG. 7 shows an automatic pneumatic pressure control apparatus 10B according to another embodiment of the present invention. The automatic pneumatic pressure control apparatus 10B differs from the automatic pneumatic pressure control apparatus 10 shown in FIG. 1 in that the pneumatic actuator 14 is replaced with a pneumatic tank 301, the pneumatic pressure in the pneumatic tank 301 is measured by a pressure gage 302, and an electric output signal from the pressure gage 302 is supplied as a feedback signal Sf to the microcomputer 16. The automatic pneumatic pressure control apparatus 10B has a control system arrangement which is the same as those shown in FIGS. 4 and 6, and can be operated with different proportionality coefficients, different proportional gains, or a different reference value Svr.

According to the present invention, as described above, when a change occurs in the speed of the output controlled variable, i.e., a change occurs in the differential of the output controlled variable, or stated otherwise, when the differential of the output controlled variable becomes a predetermined value, the P control mode or the PD control mode switches to the PID control mode. If the principles of the invention are applied to a pneumatic device which suffers a dead time at the start of operation, then the pneumatic device is prevented from suffering an overshoot or an oscillation.

When the signal transfer characteristics of an automatic pneumatic pressure control apparatus are changed, the speed, rather than the error, is detected to change control modes. Accordingly, the present invention can flexibly handle a change in the signal transfer characteristics of the automatic pneumatic pressure control apparatus.

Furthermore, the P control mode or the PD control mode switches to the PID control mode upon detection of a change in the differential of the output controlled variable. Therefore, if the transfer function changes, e.g., if the output control variable of a pneumatic device having a dead time happens to fail to change due to, for example, the stoppage of a valve body owing to sliding friction or the shutdown of an actuator, then since the I control mode has started before the valve body or the actuator is stopped, the valve body or the actuator can be moved again under the I control mode.

Although certain preferred embodiments of the present invention have been shown and described in detail, it should be understood that various changes and modifications may be made therein without departing from the scope of the appended claims.

What is claimed is:

1. A method of controlling an automatic pneumatic pressure control apparatus which detects, with a detector, an output controlled variable from a pneumatic device actuated by a manipulated variable signal, converts the output controlled variable into a feedback quantity, automatically controls the pneumatic device depending on an error based on the feedback quantity and a reference signal, and generates said manipulated variable signal, comprising the steps of:

changing said reference signal stepwise from a first value to a second value thereby to change the output controlled variable from said pneumatic device from a given value to a desired value;

supplying said manipulated variable signal in a PD control mode to said pneumatic device at an initial time when said reference signal changes stepwise from the first value to the second value; and operating a switch configured to activate an integrator circuit, thereby changing from said PD control mode to a PID control mode and supplying said manipulated variable signal in said PID control mode to said pneumatic device, said switch being operated when a differential of said output controlled variable reaches a predetermined value at a time after said initial time.

2. A method according to claim 1, wherein said PD control mode operates in a proportional mode when the differential of said output controlled variable is substantially zero.

3. A method according to claim 1, wherein said pneumatic device comprises an electropneumatic transducer, and said output controlled variable comprises a pressure.

4. A method according to claim 2, wherein said pneumatic device comprises an electropneumatic transducer, and said output controlled variable comprises a pressure.

5. A method according to claim 1, wherein said pneumatic device comprises an electropneumatic transducer and an actuator controlled by an output pressure produced by said electropneumatic transducer, and said output controlled variable comprises an output quantity produced by said actuator.

6. A method according to claim 2, wherein said pneumatic device comprises an electropneumatic transducer and an actuator controlled by an output pressure produced by said electropneumatic transducer, and said output controlled variable comprises an output quantity produced by said actuator.

7. A method according to claim 5, wherein said actuator comprises a flow control valve.

8. A method according to claim 6, wherein said actuator comprises a flow control valve.

9. An automatic pneumatic pressure control apparatus comprising:

a computer being supplied with a reference signal and a feedback signal and configured to output a manipulated variable signal depending on an error based on the feedback signal and the reference signal;

a pneumatic device actuatable by the manipulated variable signal;

a detector configured to detect an output controlled variable produced by the pneumatic device and to convert the detected output controlled variable into a feedback quantity, wherein said reference signal is changed stepwise from a first value to a second value thereby to change the output controlled variable from said pneumatic device from a given value to a desired value; and said computer comprises, means for supplying said manipulated variable signal in a PD control mode to said pneumatic device at an initial time when said reference signal changes stepwise from the first value to the second value, and means for changing from said PD control mode to a PID control mode and supplying said manipulated variable signal in said PID control mode to said pneumatic device when a differential of said output controlled variable reaches a predetermined value at a time after said initial time.

10. An automatic pneumatic pressure control apparatus according to claim 2, wherein said PD control mode operates in a proportional mode when the differential of said output controlled variable is substantially zero.

11. An automatic pneumatic pressure control apparatus according to claim 9, wherein said pneumatic device comprises an electropneumatic transducer, and said output controlled variable comprises a pressure.

12. An automatic pneumatic pressure control apparatus according to claim 10, wherein said pneumatic device comprises an electropneumatic transducer, and said output controlled variable comprises a pressure.

13. An automatic pneumatic pressure control apparatus according to claim 9, wherein said pneumatic device comprises an electropneumatic transducer and an actuator controlled by an output pressure produced by said electropneumatic transducer, and said output controlled variable comprises an output quantity produced by said actuator.

14. An automatic pneumatic pressure control apparatus according to claim 10, wherein said pneumatic device comprises an electropneumatic transducer and an actuator controlled by an output pressure produced by said electropneumatic transducer, and said output controlled variable comprises an output quantity produced by said actuator.

15. An automatic pneumatic pressure control apparatus according to claim 9, wherein said actuator comprises a flow control valve.

16. An automatic pneumatic pressure control apparatus according to claim 10, wherein said actuator comprises a flow control valve.

\* \* \* \* \*